United States Patent [19]

Nimberger

[11] Patent Number: 4,597,581
[45] Date of Patent: Jul. 1, 1986

[54] PRESSURE SEAL FOR VALVE STEMS AND THE LIKE

[75] Inventor: Spencer M. Nimberger, Houston, Tex.

[73] Assignee: General Screw Products Company, Houston, Tex.

[21] Appl. No.: 729,032

[22] Filed: Apr. 30, 1985

[51] Int. Cl.[4] .................. F16J 15/10; F16K 41/04
[52] U.S. Cl. ...................... 277/12; 277/205; 277/1; 251/214
[58] Field of Search ............ 277/1, 12, 32, 165, 277/205, 206 R; 251/214, 223

[56] References Cited

U.S. PATENT DOCUMENTS

| 1,495,761 | 5/1924 | Moussette | 251/214 |
| 2,705,177 | 3/1955 | Waring | 277/205 X |
| 3,921,991 | 11/1975 | Beck | 251/214 X |
| 4,556,196 | 12/1985 | Nimberger | 251/223 X |

FOREIGN PATENT DOCUMENTS 486716 6/1938 United Kingdom ............ 251/214

Primary Examiner—Robert S. Ward
Attorney, Agent, or Firm—Norvell & Associates

[57] ABSTRACT

An improved elastomeric seal for preventing both low or high pressure fluid from escaping past a rotatable valve stem or similar shaft. The annular seal comprises an outer generally envelope-shaped first plastic member for sealing engagement with the rotatable stem and valve bonnet, and an inner second plastic member substantially encapsulated by the first member. The annular legs of the envelope-shaped member are positioned downstream from fluid pressure, thereby sealing the inner second member from fluid attack. Novel techniques are employed for forming the elastomeric seal outside the valve bonnet by applying a substantial radially-directed force for deforming the first plastic member into the envelope configuration, while deforming the inner plastic member into an elliptical configuration. The seal in the substantially deformed configuration is then assembled within the bonnet cavity while preventing radial expansion of the envelope-shaped member.

20 Claims, 6 Drawing Figures ns and the base width
being slightly less than the annulus spacing. Further
examples of single material and bi-material seals are
disclosed in the brochure entitled "Parker Seals—Total
Hydraulic/Pneumatic Sealing Systems", PPD3700,
distributed by The Parker Hannifin Corporation.

Although the above-described uni-material bi-material lip seals have found acceptance in many applications, such seals have at least three significant drawbacks which limit their acceptance in many other applications: (1) many of such seals are relatively expensive to manufacture, wherein the configuration of both the interior and exterior surfaces of the sealing member require special machining or forming techniques; (2) such seals typically cannot be easily "downsized" to fit within thin annular cavities, partially because a very small material diameter would be required for the inner O-ring; and (3) the inner O-ring material, being subjected to the pressurized fluid environment, would frequently experience a relatively short life and result in the loss of a low pressure seal.

The disadvantages of the prior art are overcome by the present invention, and an improved bi-material pressure seal is hereinafter provided. In a typical application, the seal of the present invention may be used in a relatively thin annulus between a valve bonnet and a rotatable valve stem. Also enclosed are novel techniques for forming such a seal and positioning the seal within the desired annulus.

SUMMARY OF THE INVENTION

In a suitable embodiment of the invention, an outer Teflon ® ring or shell having an envelope-shaped configuration is provided for sealing engagement with a valve bonnet and a valve stem. An elliptical-shaped Viton ™ core is at least substantially encompassed by the outer shell, and produces radially directed pressure on the legs of the shell to maintain sealing engagement with the bonnet and valve stem. The leg ends are provided downstream from the sealing area to protect the inner elastomeric material from the pressurized fluid. A back-up ring may be provided in the annulus adjacent the leg ends of the seal, and a seal retainer utilized to maintain the position of the seal within the annulus.

The seal of the present invention is conveniently formed outside the annulus from a cross-sectional U-shaped Teflon ring or shell and an elastomeric O-ring positioned in the base of the ring cavity. The shell and O-ring are positioned on the valve stem, and substantial radially-directed inward force is applied to the shell to simultaneously deform the U-shape member into a thinner, envelope-shaped member while compressing the inner O-ring into an elliptical configuration. While maintaining a radially inward directed force applied to the outer leg of the shell, the seal and valve stem are thereafter inserted into the valve bonnet, with the seal filling the annulus between the stem and bonnet. The seal may thereafter be positioned into engagement with the back-up ring, turning the leg ends inward to further encapsulate the core material. Finally, the retaining ring may be installed to secure the seal into position.

The seal of the present invention may be economically manufactured in various sizes at even relatively low production volumes. The U-shaped ring may be easily manufactured by various techniques, and the special seal deformation and assembly techniques de-

PRESSURE SEAL FOR VALVE STEMS AND THE LIKE

BACKGROUND OF THE INVENTION

The present invention relates to fluid pressure seals and, more particularly, to bi-material elastomeric seals for sealing both low and high pressure fluids in a relatively thin annulus between a body and a rotatable shaft, such as that provided between a valve bonnet and a rotatable and axially movable valve stem.

Various types of unitary material and bi-material seals have been devised for sealing a cavity from the environment. The common elastomeric O-ring is probably the simplest and most common form of a seal. Examples of more expensive bi-material seals are shown in U.S. Pat. Nos. 2,705,117; 3,326,560; and 4,173,129. In specialized circumstances, the need for a satisfactory seal has resulted in specially-shaped and relatively expensive seals, as shown for example in U.S. Pat. Nos. 3,052,476; 3,158,376; 4,304,415; 4,428,589; and 4,438,935.

O-ring seals are also frequently used for sealing pressurized fluid within a cavity, and a modified O-ring seal and rod wiper is disclosed in U.S. Pat. No. 3,921,991. Fluid temperatures, fluid pressures, and/or chemical or corrosive properties of the fluid often limit the use of O-ring pressure seals, however, since highly elastic sealing materials tend to experience substantially reduced seal life when subjected to these environments.

Another type of bi-material fluid pressure seal may be broadly described as an encapsulated O-ring, wherein the O-ring provides the desired low pressure seal, but an outer ring of another plastic material encapsulates the inner ring to prevent degradation of the inner more elastomeric material. These pressure seals are, however, relatively expensive to manufacture, particularly in sizes designed to seal a relatively thin annulus. Various encapsuated O-ring seals are available from Chicago Gasket Company, as shown in their Bulletin O-2 entitled "Mirror Finish TFE O-Rings."

Attempts to devise reliable and less expensive fluid pressure seals have resulted in various U-shaped or Y-shaped "lip" seals, wherein the open cavity between the lips of the seal is subjected to fluid pressure to increase the sealing force in response to increased fluid pressure. Such seals may be utilized singularly or may be stacked, as shown in U.S. Pat. Nos. 3,833,228; 4,053,163; 4,161,320; and 4,476,772. U.S. Pat. No. 3,892,418 illustrates a lip seal with an adjustable retaining ring; U.S. Pat. No. 3,563,558 illustrates a lip seal having undulating flanges to increase resiliency; and U.S. Pat. No. 3,920,254 discloses a V-shaped lip seal.

The above seals have not been widely accepted in many applications wherein the seal is subjected to both relatively low and relatively high fluid pressures, at least partially because such seals tend to experience poor sealing characteristics under low fluid pressure. Unitary material seals frequently lack long term resiliency, and low pressure leaks frequently develop after such seals are repeatedly subjected to high pressures. Other attempts to obtain a reliable low pressure and high pressure seal have resulted in dual-material U-shaped or Y-shaped pressure seals, wherein fluid pressure is utilized to provide the primary sealing mechanism under high fluid pressure, and the resiliency of a second plastic material is intended to provide a low pressure seal. Examples of bi-material lip seals are shown in U.S. Pat. Nos. 3,653,672; 3,885,801; 4,013,299; 4,174,846; 4,193,606; and 4,328,972.

scribed above may be easily accomplished without sophisticated tooling. The O-ring forming the inner elastomeric material is substantially compressed during assembly, so that an O-ring of a conventional material diameter may be employed for use in a relatively thin annulus typically provided between a valve stem and bonnet. The seal has a long life under various operating conditions, and retains fluid pressure after repeated use under both relatively high and low fluid pressures.

Accordingly, it is a feature of the present invention to provide an economic fluid pressure seal formed from two plastic materials.

It is a further feature of the invention to provide a seal which has a long seal life while operating under both relatively high and relatively low fluid pressures.

Still another feature of the invention is to provide a relatively inexpensive bi-material fluid pressure seal wherein the inner elastomeric material is sealed from the fluid cavity.

It is another feature of the invention to provide an economic bi-material seal for use in a relatively thin annulus.

A further feature of the invention is a method of forming a bi-material seal by applying substantial radial force to deform both materials, to then bring the seal into sealing engagemnt with a shaft, and to thereafter bring the seal into sealing engagement with a body encompassing the shaft.

It is a further feature of the invention to form a bi-material seal by applying substantially radially directed forces to deform the seal, and to thereafter maintain a radially directed inward force on the seal to retain substantially the desired seal configuration while positioning the seal in the annulus.

These and other features and advantages of the present invention will become apparent from the following detailed description, wherein reference is made to the figures in the accompanying drawings.

IN THE DRAWINGS

DETAILED DESCRIPTION OF THE INVENTION

Figure 1:
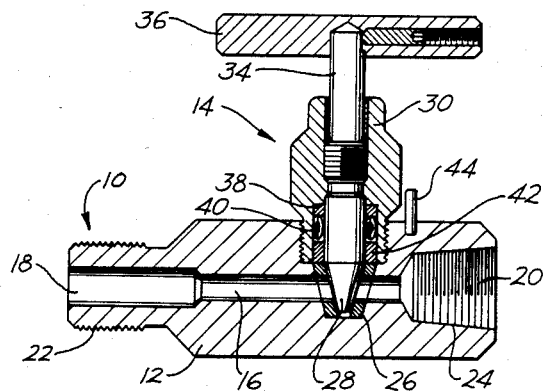
FIG. 1 is a pictorial view, partially in cross-section, of a suitable valve with a valve stem seal according to the present invention.

A valve 10 is depicted in FIG. 1 including a valve stem subassembly 12 with a seal 40 according to the present invention. The valve body 14 comprises a fluid passageway 16 having a fluid inlet 18 and a fluid outlet 20. Typically, the ends of the valve body are threaded at 22 and 24 for receiving corresponding threads of pipe sections. A portion of the fluid passageway 16 includes a valve seating surface 26 for engagement with a valve stem sealing surface 28 to open and close the valve to fluid flow.

The valve stem subsassembly 12 comprises a bonnet 30 which may be threaded to the valve body 12, a rotatable valve stem 34, and a handle 36 for manually rotating the valve stem. The valve stem 34 may be threaded to the bonnet, so that rotation of the valve stem will cause movement of the sealing surface 28 along the axis of the stem. The seal 40 in the valve stem subassembly is fitted between a thermoplastic back-up ring 38 and a retaining ring 42, which are discussed subsequently. A pin 44 affixed to the valve body prevents inadvertent rotation of the bonnet relative to the valve body.

Valve 10 shown in FIG. 1 is depicted for representative purposes, since the subject of the present invention may be used in many types of valves and other equipment. The seal 40 provides sealing engagement between a body, such as the valve bonnet 30, and a rotatable shaft, such as valve stem 34, so that pressurized fluid does not escape from the assembly.

Figure 2:
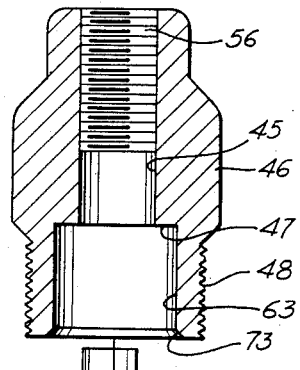
FIG. 2 is an exploded view, partially in cross-section, of an alternate embodiment of the valve stem assembly shown in FIG. 1.

FIG. 2 is an exploded view of an alternate valve stem subassembly, with a ball for forming a metal to metal seat with the valve body instead of a tapered sealing surface for engagement with a plastic seat. The bonnet 46 includes external threads 48 for threaded engagement with a valve body, and threads 54 for threaded engagement with internal threads 56 of the bonnet. The rotatable valve stem 50 includes a received surface 52 for engagement with a handle (not depicted). Valve stem 50 is movable along the axis 52 for bringing ball 58 into and out of engagement with a suitable valve seating surface.

FIG. 2 also depicts other components of a typical valve stem subassembly, including an annular thermoplastic back-up ring 60 for engagement with the surface 62 of the bonnet. Close tolerance may be easily maintained between the ID of ring 60 and the OD of the valve stem 50, so that under high fluid pressures the plastic seal will not tend to flow or creep down the valve stem. Prior to assembly, it may be seen from FIG. 2 that the seal of the present invention includes an O-ring member 62 formed from a suitable elastomeric material (e.g., Viton TM ), and a ring or shell member 64 having a generally U-shaped cross-sectional configuration formed from another suitable plastic (e.g., Teflon ®). The O-ring 62 is preferably formed from material having a greater elasticity than the material of the shell 64, and the material diameter of O-ring 62 substantially corresponds to the gap between the inner lip 66 and the outer lip 68 of the U-shaped shell member. The inner diameter of leg 66 substantially corresponds to the outer diameter of stem 50, although prior to assembly the outer diameter of leg 68 is substantially greater than the inner diameter 63 of the bonnet. Once properly positioned between the bonnet and the stem, the seal of the present invention may be retained by a suitable retaining member 70 having a lip 72 adapted for engagement with the tapered surface 73 of the bonnet. Member 70 may typically press-fit or otherwise secured to the bonnet during the assembly operation.

Suitable methods and tools for forming the seal according to the present invention are discussed below. It is a feature of the invention to form the seal on a rotatable shaft, such as valve stem 50 before the shaft is properly secured in the accompanying body, such as bonnet 46. As described further below, the U-shaped shell 64 and O-ring 62 are substantially deformed by a radially inward force after these components are fitted onto the shaft and prior to insertion of this shaft into the body. Thereafter, this compressed or deformed seal geometry is substantially maintained while the seal and shaft are simultaneously positioned in the body cavity, so that the compressed seal fills the annulus between the body and shaft.

Figure 3:
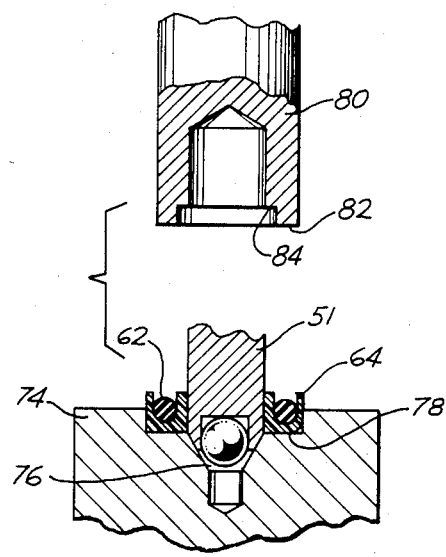
FIGS. 3 and 4 are pictorial views, partially in cross-section, of suitable tooling utilized to form a seal according to the present invention.
Figure 4:
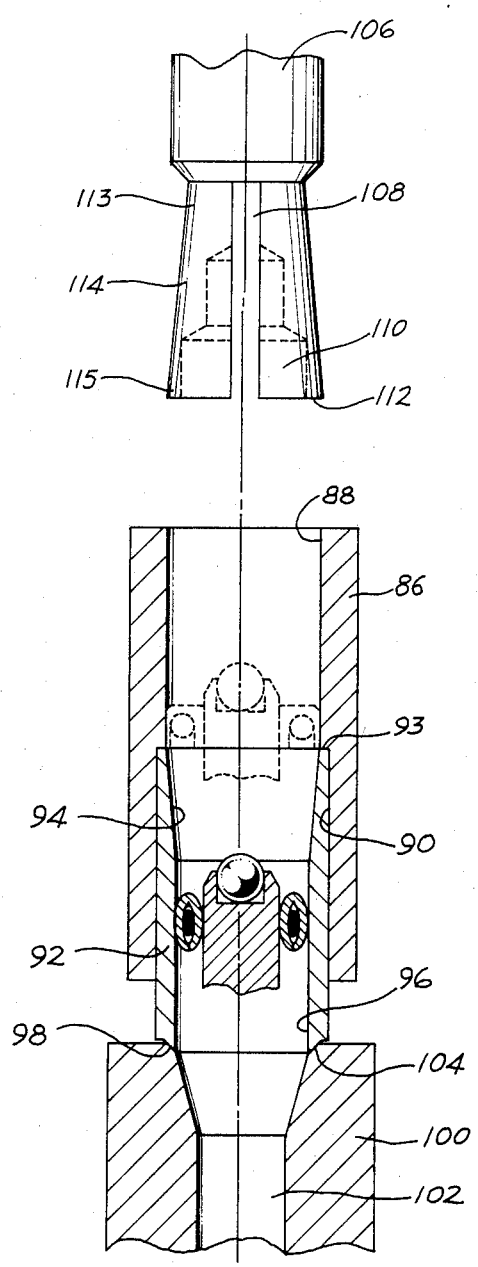

Referring now to FIGS. 3 and 4, suitable tools are provided for fitting the shell 64 and O-ring 62 on the portion 51 of the shaft intended for sealing relationship with the seal. (FIG. 3 illustrates the seal positioned on the shaft, although this will soon be understood as the last step of this initial procedure.) It should be understood that O-ring 62 is substantially elastic (e.g., Compression Modulus from 800 to 2000 psi and having a typical durometer range of from 70 to 90), while the material for shell 64 is comparatively inelastic (e.g., Compression Modulus in excess of approximately 50,000 psi).

Seal fixture 74 includes a drilled bore 76 suitable to subsequently accept the end of the shaft, and a planar recessed surface 78 has been formed having a diameter slightly greater than the initially formed shell. Once the shell 64 is fitted on shelf 78 with the circular U-body aperture upwards, the O-ring 62 may be placed between the inner and outer legs 66 and 68 of the shell. Since the material of both the O-ring and shell are plastic and close tolerances are maintained between the material diameter of the O-ring and the gap between the legs, a hand tool 80 may be utilized to press the O-ring downward to the bottom of the gap, as shown in FIG. 3. Hand tool 80 has a circular end 82 for engaging the O-ring, with end 22 having a diameter and thickness adapted for fitting in the gap between the legs 66 and 68. If desired, a planar stop surface 84 may be formed on tool 80 for engaging the inner leg 66, so that the operator will notice substantially increased resistance during this pressing operation and "feel" when the O-ring is properly seated in the shell. Once seated, tool 80 is removed, and the ball end of shaft portion 51 is slipped into the ID of the shell. When the tapered end surface of portion 51 engages a corresponding tapered surface of bore 76, the seal material has been positioned on the shaft, and the shell 64 and O-ring 62, carried by the shaft, may be removed from the fixture 74.

The next seal-forming operation is illustrated in FIG. 4. Although the shell and O-ring carried by the shaft are shown in both an initial and final position in FIG. 4, it may be initially assumed that the shaft and seal are disassociated from the tools shown. Die tool 92 may first be slipped into sleeve 86, and both components then set on top of fixture 100. Sleeve 86 has a first portion with a cylindrical bore 88 approximating the outer diameter of the undeformed shell 64, and a second portion having a bore diameter 90 for receiving the die 92 as shown. Die 92 has a slightly tapered conical deforming surface 94, and a lower portion having a smaller diameter bore 96. The end 93 of the die is adapted for engagement with the shelf between bores 88 and 90, and tapered lip 98 at the other end of the die is positioned within the champered surface 104 of fixture 100. Fixture 100 has a bore 102 adapted for receiving the handle end of stem 50, and enables the stem to be moved from the initial to the final position.

With the fixtures as shown in FIG. 4, the shaft (ball end up) may be lowered into the assembly to the position substantially as shown in the dashed lines in FIG. 4. The larger diameter end of surface 94 closely approximates the outer diameter of the shell and the ID of bore 88. A plastic-material hand tool 106 may then be lowered for engagement with the base of the shell 64, and a simple press utilized to deform the shell and O-ring to the seal as shown in bore 96 of the die. During this motion, it should be understood that the valve stem is simultaneously moving downward as the seal is being formed. Because of the slight taper of surface 94, a relatively large and equally distributed radially inward force is generated to compress the shell and O-ring. To deform a suitable valve stem seal formed from a nominal 0–11 size O-ring employed for a valve stem seal as shown in FIG. 1, a radially inward force in the range of from 750 lbs. to 1250 lbs. may be utilized to cause the substantial deformation of the shell and O-ring as shown. It should be understood that substantial inelastic deformation of the shell typically occurs during this deformation process, so that even if the shell diameter were not thereafter restrained from expanding, the shell would not return to the geometrical-shaped cross-sectional configuration shown in FIG. 2.

Tool 106 may be formed with a slight radially outward taper 114, so that the diameter of the tool adjacent the end 112 is slightly greater than the diameter at 113. A bore 110 may be drilled in the end of the tool, forming a thin plastic sleeve portion 115. A slot 108 may be cut through the tapered portion of the tool, allowing both halves of the plastic tool end to move radially inward. Accordingly, it should be understood that the end surface 112 of tool 106 will remain in contact with the leg ends of the shell during the entire deforming operation.

Figure 5:
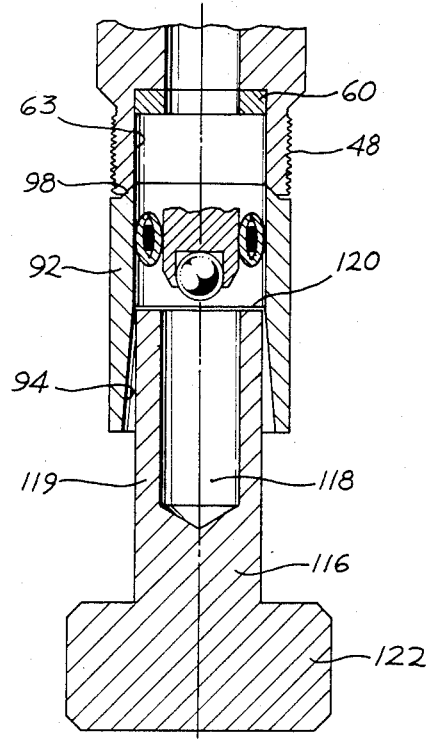
FIG. 5 is a pictorial view, partially in cross-section, of suitable tooling for positioning a deformed seal according to the present invention within the valve bonnet shown in FIG. 2.

Once the seal deforming operation is complete, tool 106 is removed and sleeve 86, die 90, stem 50, and the seal may be raised as an assembly out of the fixture 100. Referring now to FIGS. 2 and 5, threads 54 of shaft 50 may then be threaded to the bonnet 46 until the tapered lip 98 of the tool engages the surface 73 of the bonnet. At this stage, the compressed seal is ready for transfer to the bonnet, since the bore 96 of the die is aligned with and corresponds in diameter to the bore 63 of the bonnet.

For the transfer operation, sleeve 86 may be removed from the die and tool 116 used with an arbor press to transfer the seal to the bonnet. Tool 116 includes a bore 118 forming an elongate thin-walled sleeve portion 119. The end of sleeve 119 engages the base of the seal (opposite the leg ends) and the seal is slipped into the bonnet bore along the stem 50. During this seal transfer operation, stem 50 need not be either rotated or axially moved, and the transfer of the seal from the die 92 to the bonnet will be quickly accomplished. Once the transfer to the bonnet has been made, the die 92 may be removed and tool 116 manually used to push the seal into engagement with the retaining ring 60. The retainer 72 (see FIG. 2) may then be installed and, if necessary, the stem further threaded to the bonnet. An expanded view of a suitable seal installed between a valve stem and bonnet is shown in FIG. 6.

As previously indicated, it is a feature of the present invention that the outer shell material deform to a substantially envelope-shaped cross-sectional configuration to compress the inner core material. The unsealed "seam" of the completed seal is downstream from the location where the seal with the valve stem and bonnet is located so that no fluid from the pressure cavity engages the inner core material. Also, the seal according to the present invention exerts and continually maintains a substantially radially directed force on both the stem and bonnet since the elastic core material is deformed from a circular configuration to an elliptical configuration. These two features are preferably obtained by initially forming the seal outside the body, as described herein, and then transferring the deformed seal to the body along the shaft. The exemplary procedure described herein for forming the seal and transferring the seal to the body is particularly advantageous in an assembly, like the valve stem and bonnet described herein, wherein the annulus to be sealed is thin and effectively terminates downstream from the seal.

Figure 6:
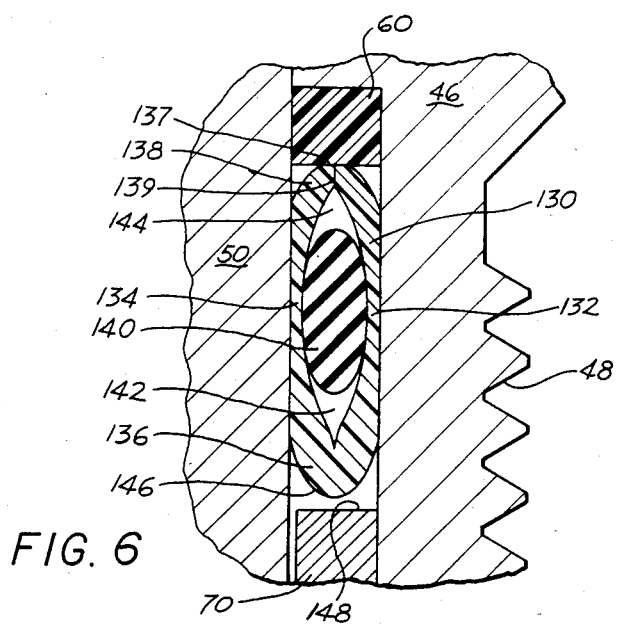
FIG. 6 is a cross-sectional view of the valve stem and bonnet seal generally depicted in FIG. 1.

It would be extremely difficult if not impossible to obtain the desired geometrical configuration of the seal in the location as shown in FIG. 6 if one simply attempted to insert the seal into the thin annulus while deforming the seal. Referring to FIG. 2, the shoulder surface 47 prohibits the seal from being installed in the annulus from the stem handle end of the bonnet. Moreover, installation of a slightly compressed lip seal from the pressure or sealing side of the bonnet is accomplished in the prior art since the lip ends trail the seal and may therefore be slightly compressed during the installation process. An attempt at simultaneously deforming while installing the significantly compressed seal of the present invention with the lips leading, however, presents additional problems, and would likely result in the shell being damaged during installation. According to the present invention, however, the seal is preferably deformed and retained in a compressed state prior to installation in the annulus to be sealed. Also, a relatively lubricious seal material may be selected, such as Teflon ®, resulting in a low frictional force between the sidewalls of the bonnet, the die, and the valve stem during the seal transfer operation. Moreover, the compressed seal maintains a substantial area surface-to-surface contact with both the stem and the die (or bonnet), rather than a line contact seal commonly employed in bi-material seals, which reduces the difficulty when the leg ends lead during assembly.

FIG. 6 depicts an exploded cross-section of the seal between a stem 50 and a bonnet or gland 46. The shell 64 is deformed to an envelope-shaped member 130 having a base 136 and relatively thin inner and outer legs 132 and 134. The base 136 may be rounded at 146 during the forming operation, and leg ends 138 downstream from the sealing surfaces will typically be closely adjacent or may be engaging as shown in FIG. 6. End surface 137 of each leg may be relatively perpendicular to the axis of the stem as a result of the forming operation described earlier, and the leg ends may be substantially sealed at seam 139, especially if the seal is forcefully retained against back-up ring 60. End 148 of retainer 70 secures the sealing in position, and prevents axial movement of the seal when the stem is rotated for opening and closing the valve.

FIG. 6 depicts that O-ring 62 has been deformed to the elliptical core 140. Under low pressure in the valve, the resiliency in the core 140 primarily results in the radial force which maintains the seal between annular leg 132 and the bonnet, and between annular leg 134 and the stem. Each of these seals is a surface-to-surface seal, rather than being a line-to-surface seal, and preferably the length of the envelope in sealing engagement with both the bonnet and the stem (in the axial direction) is at least as great as the length of the core material 140. A reliable seal is also made between the bonnet and valve stem according to the present invention when the valve is under a relatively high fluid pressure, i.e., in excess of 2000 psi. Good sealing ability under high fluid pressure is at least partially due to the continued significant radial force exerted on the relatively thin legs by the core 140. It is also believed, however, that increased fluid pressure increases the sealing force with the stem and bonnet. Increased fluid pressure may result in end 146 of the seal moving slightly upward to disengage the retainer, as shown in FIG. 6. This compression of the seal in the axial direction may be partially responsible for the increased radial sealing force. Also, it is believed significant that the seal formation techniques as explained earlier result in a slight annular air cavity 142 between the base of the envelope and the lower portion of the core. It is believed that an increased fluid pressure in the valve results in a deflection of the material 136 toward the air cavity 142 and, since the core material is in sealing engagement with the legs 132 and 134, a pressure increase in cavity 142 is obtained. An increase in the axial directed force on the core material 140 as a result of pressure increase in cavity 142, in turn, further compresses the core material, and may therefore contribute to the increased radially directed sealing force under high fluid pressure. A similar air cavity 144 below the upper portion of the core 140 and the leg ends 138 may be partially filled by the elastic core material as pressure in the valve increases, and the resulting additional compression of the core material again further adds to an increase in the sealing force with the stem and bonnet.

In effect, it is believed that the seal of the present invention behaves substantially like an elastomeric O-ring: under low fluid pressure, the elasticity of the material results in a low pressure seal; under high fluid pressure, the core material is compressed, resulting in an increased radial force to increase sealing engagement. Unlike a typical O-ring installation, however, the inner elastomeric material of the present invention is more drastically compressed prior to installation, and thus exerts a greater sealing force under no or low fluid pressure. Also, unlike an O-ring installation, the elastomeric material according to the present invention is sealed from the fluid medium, thereby substantially increasing seal life. Even if a minor amount of the pressurized fluid medium were to bypass the sealing surface with either the stem or the bonnet, the fluid would likely flow upward in interstices between the stem and bonnet rather than flow backwards between the seam 139 and contact the core.

A reliable yet relatively inexpensive seal is formed as described above, and this cost reduction is a significant advantage of a valve stem subassembly according to the present invention. Although the procedure for forming the seal and subsequently inserting the seal into the bonnet have been described above in detail, this procedure is not labor intensive. Moreover, the associated tooling and equipment for this procedure is neither complex nor expensive. Materials for forming the seal are similarly relatively inexpensive or easily manufacturable. According to the present invention, commercially available O-rings may be employed since the O-ring material is substantially compressed prior to insertion in the annulus. In fact, the nominal diameter of an O-ring suitable according to the present invention may be significantly greater than the annulus spacing. Also, an inexpensive moldable plastic shell material may be utilized, with the desired initial geometric configuration formed from standard injection molded, compression molded, or machining techniques. The initial geometry of the shell 64 is simplified in that both the ID and OD of the shell are substantially planar, other than having one or more projecting lips common to many seals. The shell may thus be inexpensively manufactured at even relatively low production volumes.

A further advantage of the seal according to the present invention is that the envelope material and core material may each be selected for their separate desired functions depending on the particulars of their intended use. For example, a preferable material for the O-ring may be selected because of its high resiliency and durability under the anticipated temperature range for the valve, with little or no regard for the chemical properties or corrosion characteristics of the fluid passing through the valve. Although bi-material pressure seals are known in the art, the resilient member generally was in engagement with the fluid, while the present invention seals the core material from the fluid. Also, a highly resilient envelope material is not required, since the compressed leg members 132 and 134 are relatively thin and a large surface sealing area is provided. A cost effective shell material may therefore be selected having good machining, durability, and lubricity characteristics.

As an example of the increased versatility of the present invention, a shell material may be selected because of its preferred chemical and abrasion resistant properties to known type of the fluids in the valve, or because of excellent wear and/or reduced static and dynamic friction properties. The elastic core material, on the other hand, may have relatively poor chemical resistant, abrasion resistant, wear and lubricating properties, but have desired high elasticity over a long life within the anticipated temperature range. Thus, each material may be selected for its desired properties; substantial elasticity of the shell material is not required, while the selected core material may have poor chemical resistant properties. The versatility of the seal is substantially increased, and different materials for the shell and the core may be used for specific applications without significantly increasing manufacturing costs for the seal.

According to a particular embodiment of the present invention, the shell 64 is fabricated with the thickness of inner leg 66 being greater than the thickness of outer leg 68. After deformation of the seal, the slightly thicker inner leg is in engagement with the running seal (due to stem rotation and axial movement), while the thinner outer leg is in static or fixed engagement with the bonnet. Since the annulus between the bonnet and stem may be relatively thin, the additional material on the inner leg enhances seal life. When the stem 64 is initially manufactured, the base portion connecting the legs need not be substantially thicker than the thickness of the inner leg. A relatively thin base for this shell is preferable to achieve the desired high pressure seal characteristics, as previously explained, wherein the base 136 of the envelope may more easily "flow" to further compress the core material.

In typical embodiments of the present invention, the inner elastomeric material has a circular cross-sectional configuration, and the material OD prior to deformation is greater than, and preferably at least 75% greater than, the width or gap of the annulus. After compression, the core material achieves an elliptical-shaped cross-sectional configuration, and the width (minor axis of the ellipsis) of the core material is from 60% to 90% of the annulus gap while the length (major axis of the ellipsis) is at least twice that of the minor axis. After compression, the thickness of the inner leg of the shell in line with the minor axis is less than 25% of the annulus gap, and preferably less than 20% of the annulus gap, while the corresponding thickness of the leg in static engagement with the bonnet is less than 20%, and preferably less than 15%, of the annulus gap.

Many modifications to the seal and valve assembly may be made according to the present invention. Various plastic or synthetic materials may be utilized for forming the shell such as Ryton TM, Teflon ®, Peek TM or Nylon ®. The O-ring may be formed from suitable natural or synthetic rubber, Viton TM, or Flourel TM. These materials are, of course, merely exemplary. For a low pressure valve, the back-up ring in the valve bonnet subassembly may not be necessary. When utilized, the back-up ring may be fabricated from any number of thermoplastics. Other than plastic tool 106, which may be fabricated from Nylon ®, the other components described herein may be formed from conventional metal suitable for their intended purpose.

The seal of the present invention may be used with various assemblies for sealing an annulus between a body or rotatable shaft. In particular, the present invention is advantageous for assemblies wherein the annulus effectively terminates downstream from the pressure seal, and the seal must be inserted from the pressure side of the annulus. The present invention is well adapted for sealing the space between the valve bonnet and valve stem, and is particularly well adapted for sealing this annulus in relatively small valves, wherein the spacing between the bonnet and valve stem is narrow. The seal of the present invention may be used in valves intended for use with any number of fluids, and the term "fluid" as used herein comprises liquids, gases, and mixtures of liquids and gases. Also, a valve with the seal according to the present invention as described herein may typically be used in applications wherein the fluid in the valve body is pressurized, although it should be understood that the seal of the present invention may also effectively function to seal the annulus between the stem and bonnet in vacuum applications.

Other alternative forms of the present invention will suggest themselves in the consideration of the apparatus and techniques described herein. Accordingly, it should be understood that the methods and apparatus herein described and shown in the accompanying drawings are intended as exemplary embodiments of the present invention, and not as limitations thereto.

What is claimed is:

1. In a valve including a valve body, a seat, and a valve stem having a central axis and rotatable within said valve body for sealing engagement with said seat, an improvement for sealing an annulus between said valve body and said stem, said improvement comprising:

an annular outer member having an envelope-shaped cross-sectional configuration formed from a first plastic material and having an outer annular leg for sealing engagement with said valve body, an inner annular leg for sealing engagement with said rotatable valve stem, and a base portion interconnecting said legs;

each of said first and second legs extending axially from said base portion and terminating at a location axially opposite said seat with respect to said base portion;

an annular core member having an elliptical cross-sectional configuration formed from a second plastic material sandwiched between said first and second legs for exerting a radially directed force on each of said legs for sealing said annulus;

said legs and said base portion at least substantially encapsulating said core member and sealing said core member from fluid within said valve; and a retainer in said annulus for limiting axial movement of said outer member upon rotation of said valve stem to open and close said valve.

2. The improvement as defined in claim 1, further comprising:

a back-up ring within said annulus in engagement with an end of at least one of said inner and outer legs and having an internal diameter approximately said valve stem.

3. The improvement as defined in claim 2, wherein said end of both said inner and outer legs is in engagement with said back-up ring and said ends are at least substantially adjacent for prohibiting said core member from engaging said back-up ring.

4. The improvement as defined in claim 1, wherein each of said inner and outer legs is in sealing engagement with said valve stem and valve body, respectively, along an axial length of at least said core member.

5. The improvement as defined in claim 1, said base portion and said core material defining an air cavity between said inner and outer legs for increasing sealing engagement of said legs under high fluid pressure in said valve.

6. The improvement as defined in claim 1, wherein each of said inner and outer legs has a thickness within a radial plane passing substantially through a center of said elliptical cross-sectional configuraton of less than 25% of the thickness of said annulus.

7. The improvement as defined in claim 1, wherein a major axis of said elliptical cross-sectional configuration is at least twice a minor axis of said elliptical cross-sectional configuration.

8. An improved pressure seal for sealing an annulus between a body and a rotatable shaft passing at least partially through said body, said annulus being substantially open to fluid pressure from within said body and effectively terminating at a reduced diameter opening for receiving said shaft, said seal comprising:

an annular outer member having an envelope-shaped cross-sectional configuration formed from the first plastic material and having a first annular leg for sealing engagement with said body, a second annular leg for sealing engagement with said rotatable shaft, and a base portion interconnecting said legs;

each of said first and second legs terminating at a location axially between said reduced diameter opening and said base portion;

an annular core member sandwiched between said first and second legs for exerting a radially directed force on each of said legs for sealing said annulus; and said legs and said base portion at least substantially encapsulating said core member and sealing said core member from fluid in said body.

9. A seal as defined in claim 8, further comprising:
a retainer in said annulus for limiting axial movement of said outer member upon rotation of said shaft.

10. A seal as defined in claim 8, wherein an end of both said first and second legs are at least substantially adjacent for limiting movement of said core member toward said reduced diameter opening.

11. A seal as defined in claim 8, wherein
said core member has an elliptical cross-sectional configuration; and a major axis of said elliptical cross-sectional configuration is at least twice a minor axis of said elliptical cross-sectional configuration.

12. A method of forming a pressure seal in an annulus between a body and a rotatable shaft, comprising:

forming a ring member having a generally U-shaped cross-sectional configuration from a first plastic material, said ring member having an internal diameter approximating a diameter of said shaft, an exterior diameter substantially greater than an outer diameter of said annulus, and a circular spacing between inner and outer legs of said ring member;

positioning a second plastic material within said ring member in said spacing between said inner and outer legs;

positioning said ring member on said shaft;

exerting a substantial and uniform radially-inward force on said ring member for compressing said ring member and substantially deforming said U-shaped cross-sectional configuration of said ring member while positioned on said shaft;

inserting at least a portion of said shaft carrying said deformed ring member into said body with said deformed legs of said ring member terminating toward said body; and moving said deformed ring member axially along said shaft and into an annulus between said body and said shaft while restraining radial expansion of said deformed ring-shaped member.

13. The method as defined in claim 12, wherein exerting said force on said ring member comprises:

simultaneously moving said shaft and said ring member axially with respect to a tapered surface for uniformly applying said radially inward directed force on said ring member and substantially and inelastically deforming said U-shaped cross-sectional configuration of said ring member.

14. The method as defined in claim 13, wherein
said second plastic material is a resilient O-ring material having a circular cross-sectional configuration prior to deformation and an elliptical cross-sectional configuration after deformation;

said outer diameter of said ring member prior to deformation is at least 25% greater than said outer diameter of said annulus; and said ring member is deformed when simultaneously moving said shaft and said ring member relative to said tapered surface until said exterior diameter of said ring member substantially corresponds to said outer diameter of said annulus.

15. The method as defined in claim 13, wherein said shaft and said ring member are axially moved with respect to said tapered surface by applying an axially directed force against a base of the U-shaped ring member.

16. The method as defined in claim 13, further comprising:

restraining radially outward expansion of said deformed ring member;

simultaneously applying an axially directed force against said deformed ring member to inject said deformed ring member into said annulus.

17. The method as defined in claim 14, wherein said O-ring material is deformed from a circular cross-sectional configuration to an elliptical cross-sectional configuration having a major axis length at least twice a minor axis length.

18. The method as defined in claim 13, wherein a radially inward directed force of at least 750 pounds is applied to said ring member to deform said ring member and said second plastic material.

19. The method as defined in claim 12, further comprising:

compressing said ring member for bringing into engagement ends of said ring member legs for substantially sealing said deformed second plastic material within said deformed ring member.

20. The method as defined in claim 13, further comprising:

forming an air cavity between a base of said deformed ring member, said legs of said deformed ring member, and said deformed second plastic material.

* * * * *